(12) United States Patent
Endo et al.

(10) Patent No.: US 6,409,197 B1
(45) Date of Patent: Jun. 25, 2002

(54) CLAW-POLE DYNAMO AND BICYCLE

(75) Inventors: Takahiro Endo, Sakai; Nagahiko Nagasaka, Nakama, both of (JP)

(73) Assignee: Shimano, Inc., Osaka (JP)

( * ) Notice: Subject to any disclaimer, the term of this patent is extended or adjusted under 35 U.S.C. 154(b) by 0 days.

(21) Appl. No.: 09/372,684

(22) Filed: Aug. 11, 1999

(30) Foreign Application Priority Data

Aug. 21, 1998 (JP) .......................................... 10-235058

(51) Int. Cl.$^7$ ................................................. B62J 6/12
(52) U.S. Cl. ................ 280/288.4; 310/67 A; 310/75 C; 310/257; 180/65.3; 180/65.5
(58) Field of Search ............................... 310/257, 75 C, 310/40 R, 67 A; 280/215, 259, 212, 217, 288.4; 180/205, 206, 207, 65.1–65.5, 65.3

(56) References Cited

U.S. PATENT DOCUMENTS

| | | | |
|---|---|---|---|
| 4,500,772 A | * 2/1985 | Ahner et al. ................ 219/209 |
| 4,559,464 A | * 12/1985 | Stokes ......................... 310/233 |
| 4,860,176 A | * 8/1989 | Bauwens et al. ............. 362/72 |
| 4,891,567 A | 1/1990 | Fujitani et al. ............. 318/254 |
| 4,959,577 A | * 9/1990 | Radomski ................... 310/263 |
| 4,990,806 A | 2/1991 | Kikuchi et al. ........... 310/49 A |
| 5,574,324 A | * 11/1996 | Hirama et al. .............. 310/194 |
| 5,585,766 A | * 12/1996 | Shel .......................... 333/17.3 |
| 5,757,102 A | * 5/1998 | Adachi et al. .............. 310/263 |
| 5,828,145 A | 10/1998 | Nakamura ................. 310/67 A |
| 6,118,196 A | * 9/2000 | ChengOyon .............. 310/75 C |
| 6,166,470 A | * 12/2000 | Miyazawa et al. .......... 310/181 |
| 6,222,286 B1 | * 4/2001 | Watanabe et al. ......... 310/49 R |
| 6,259,176 B1 | * 7/2001 | Isozaki et al. ............. 310/49 R |

FOREIGN PATENT DOCUMENTS

| | | |
|---|---|---|
| DE | 298 06 210 U1 | 12/1998 |
| EP | 591724 A1 | 4/1994 |

(List continued on next page.)

OTHER PUBLICATIONS

Patent Abstracts of Japan, vol. 12, No. 420, dated Nov. 8, 1988, and JP 63–157648, Jun. 30, 1988.

Patent Abstracts of Japan, vol. 1996, No. 1, dated Jan. 31, 1996, and JP 7–236238, Sep. 5, 1995.

*Primary Examiner*—Brian L. Johnson
*Assistant Examiner*—Daniel Yeagley
(74) *Attorney, Agent, or Firm*—James A. Deland

(57) ABSTRACT

A claw pole dynamo includes an annular member having a magnet extending in a circumferential direction thereof for rotation around an axis; a first stator yoke having a first annular portion and a plurality of first pole shoes extending in a direction of the axis and in close proximity to the magnet, wherein the first annular portion defines a plurality of first discontinuities (such as slots) in a circumferential direction thereof for suppressing eddy currents in the first annular portion; a second stator yoke having a second annular portion and a plurality of second pole shoes extending in the direction of the axis and in close proximity to the magnet, wherein the plurality of first pole shoes are interleaved with the plurality of second pole shoes in the circumferential directions of the first and second annular portions; a core yoke for magnetically coupling the first stator yoke and the second stator yoke and for transmitting a magnetic flux in the direction of the axis; and a coil disposed around the core yoke. The plurality of discontinuities suppress the eddy currents in the first stator yoke. If desired, the second stator yoke could have a similar plurality of discontinuities in the second annular portion thereof to suppress eddy currents in the second annular portion. A first separation member with a plurality of discontinuities may be disposed between the first stator yoke and the core yoke to further suppress eddy currents, and the core yoke may include a plurality of sections disposed at different positions in a circumferential direction of the core yoke to further reduce eddy currents.

88 Claims, 14 Drawing Sheets

FOREIGN PATENT DOCUMENTS

| | | |
|---|---|---|
| FR | 2256572 | 7/1975 |
| FR | 2570228 | 3/1986 |
| FR | 2703650 | 10/1994 |
| JP | 5863 | 11/1941 |
| JP | 30-17214 | 11/1955 |
| JP | 32-525 | 2/1957 |
| JP | 32-1928 | 3/1957 |
| JP | 32-8026 | 7/1957 |
| JP | 48-20003 | 3/1973 |
| JP | 49-111714 | 9/1974 |
| JP | 51-53203 | 5/1976 |
| JP | 52-303 | 1/1977 |
| JP | 1-283049 | 11/1989 |
| JP | 3-117357 | 12/1991 |
| JP | 6-261511 | 9/1994 |
| JP | 6-305466 | 11/1994 |
| JP | 7-108083 | 11/1995 |
| JP | 7-291166 | 11/1995 |
| JP | 9-117121 | 5/1997 |
| JP | 9-132185 | 5/1997 |
| JP | 9-132186 | 5/1997 |
| JP | 9-286365 | 11/1997 |
| JP | 09322437 A * | 12/1997 |

* cited by examiner

CLAW-POLE DYNAMO AND BICYCLE

BACKGROUND OF THE INVENTION

The present invention is directed to power generating devices for bicycles and, more particularly, to claw-pole dynamos mounted in a bicycle hub.

An example of a conventional claw-pole power generator is described in Japanese Unexamined Patent Application (Kokai) 8-192784. In the power generator 10 described therein, two iron-core members 15 are combined with each other such that the pole shoes 15a and 15b disposed along the corresponding outer peripheries are adjacent to each other. The central portions of these iron-core members 15 are drawn (as shown in FIG. 2 of the Application), and the inner peripheral ends of the two combined iron-core members 15 are brought into contact with each other. Magnetic flux is thereby transmitted by the inner peripheral portions of the iron-core members located inside an annular coil 14, thus causing an electric current to pass through the coil 14 under the action of the alternating flux induced therein.

Considerable eddy currents are induced by the axial alternating flux in the two iron-core members when the inner peripheral portions of the iron-core members are narrowed, brought into contact with each other and coupled magnetically, as described above. Much of the power generated is therefore consumed as core loss, resulting in diminished power output.

Linking the inner peripheral portions of both iron-core members with separate members have been suggested for obtaining a structure that possesses reduced core loss. In such a structure, however, eddy currents are induced inside the iron-core members and the separate members, further lowering the efficiency of power generation. In the particular case of a power generator in which the input rotation has a low speed, such as a power supply for a bicycle lamp or a wind-powered generator for household use, a reduction in the power generation efficiency would be disadvantageous in that it would require a bulkier power generator or a stronger rotational force for power generation.

SUMMARY OF THE INVENTION

The present invention is directed to a claw-pole dynamo wherein eddy current are suppressed during power generation so as to improve the power generation efficiency of the dynamo. In one embodiment of the present invention, a claw pole dynamo includes an annular member having a magnet extending in a circumferential direction thereof for rotation around an axis; a first stator yoke having a first annular portion and a plurality of first pole shoes extending in a direction of the axis and in close proximity to the magnet, wherein the first annular portion defines a plurality of first discontinuities (such as slots) in a circumferential direction thereof; a second stator yoke having a second annular portion and a plurality of second pole shoes extending in the direction of the axis and in close proximity to the magnet, wherein the plurality of first pole shoes are interleaved with the plurality of second pole shoes in the circumferential directions of the first and second annular portions; a core yoke for magnetically coupling the first stator yoke and the second stator yoke and for transmitting a magnetic flux in the direction of the axis; and a coil disposed around the core yoke. The plurality of discontinuities suppress the eddy currents in the first stator yoke. If desired, the second stator yoke could have a similar plurality of discontinuities in the second annular portion thereof.

In another embodiment of the present invention, a claw pole dynamo includes an annular member having a magnet extending in a circumferential direction thereof for rotation around an axis; a first stator yoke having a first annular portion and a plurality of first pole shoes extending in a direction of the axis and in close proximity to the magnet; a second stator yoke having a second annular portion and a plurality of second pole shoes extending in the direction of the axis and in close proximity to the magnet; wherein the plurality of first pole shoes are interleaved with the plurality of second pole shoes in the circumferential direction; a core yoke for magnetically coupling the first stator yoke and the second stator yoke and for transmitting a magnetic flux in the direction of the axis; a coil disposed around the core yoke; and a first separation member disposed between the first stator yoke and the core yoke. If desired, the first separation member may include a plurality of discontinuities in a circumferential direction thereof to suppress eddy currents. A second separation member with or without a similar plurality of discontinuities may be disposed between the second stator yoke and the core yoke to further suppress eddy currents.

In yet another embodiment of the present invention, a claw pole dynamo may include an annular member having a magnet extending in a circumferential direction thereof for rotation around an axis; a first stator yoke having a first annular portion and a plurality of first pole shoes extending in a direction of the axis and in close proximity to the magnet; a second stator yoke having a second annular portion and a plurality of second pole shoes extending in the direction of the axis and in close proximity to the magnet; wherein the plurality of first pole shoes are interleaved with the plurality of second pole shoes in the circumferential direction; a core yoke for magnetically coupling the first stator yoke and the second stator yoke and for transmitting a magnetic flux in the direction of the axis; wherein the core yoke includes a plurality of sections disposed at different positions in a circumferential direction of the core yoke; and a coil disposed around the core yoke. The plurality of sections in the core yoke help to suppress eddy currents in the core yoke.

DETAILED DESCRIPTION OF THE EMBODIMENTS

Figure 1:
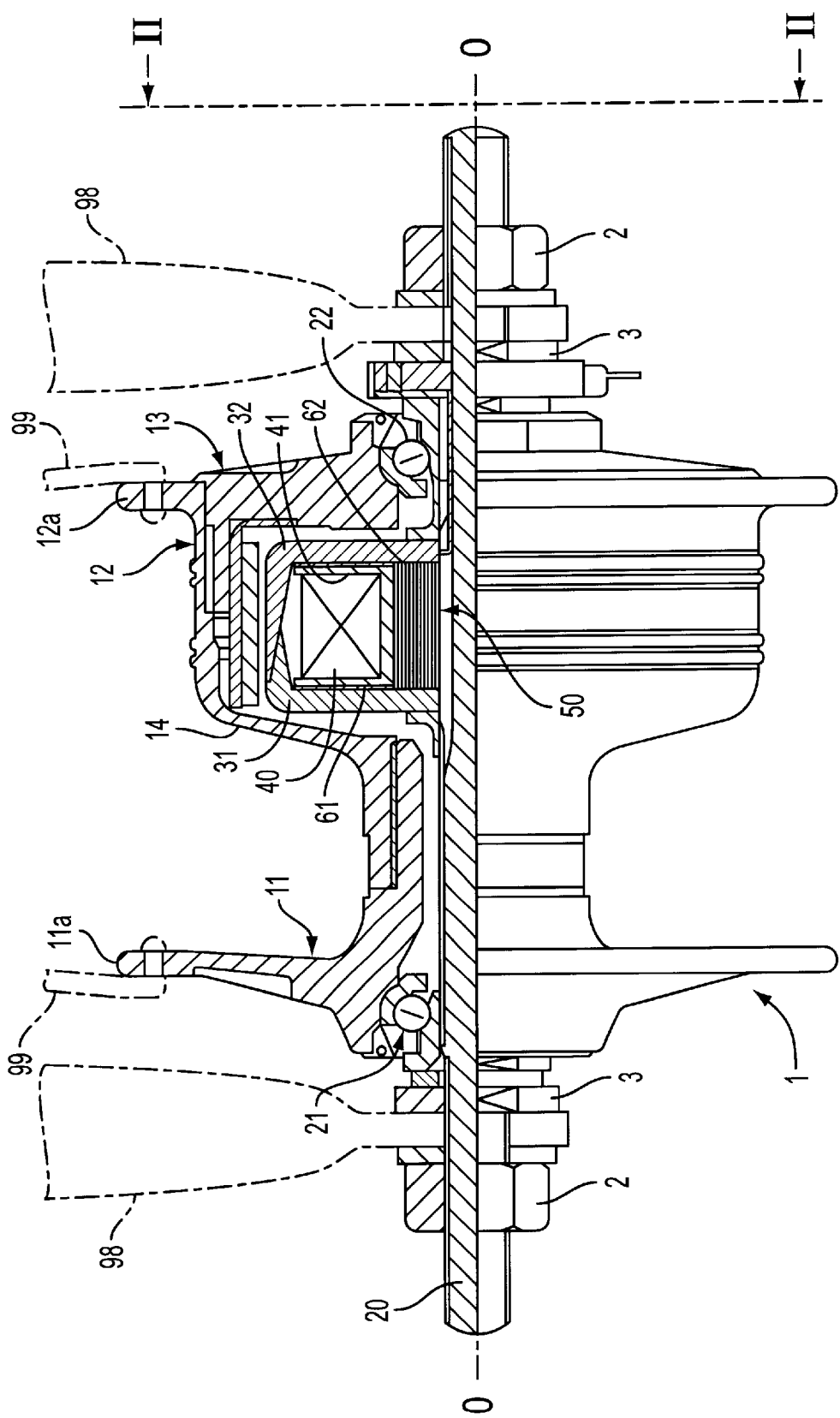
FIG. 1 is a partial cross-sectional view of a particular embodiment of a claw-pole dynamo according to the present invention.
Figure 2:
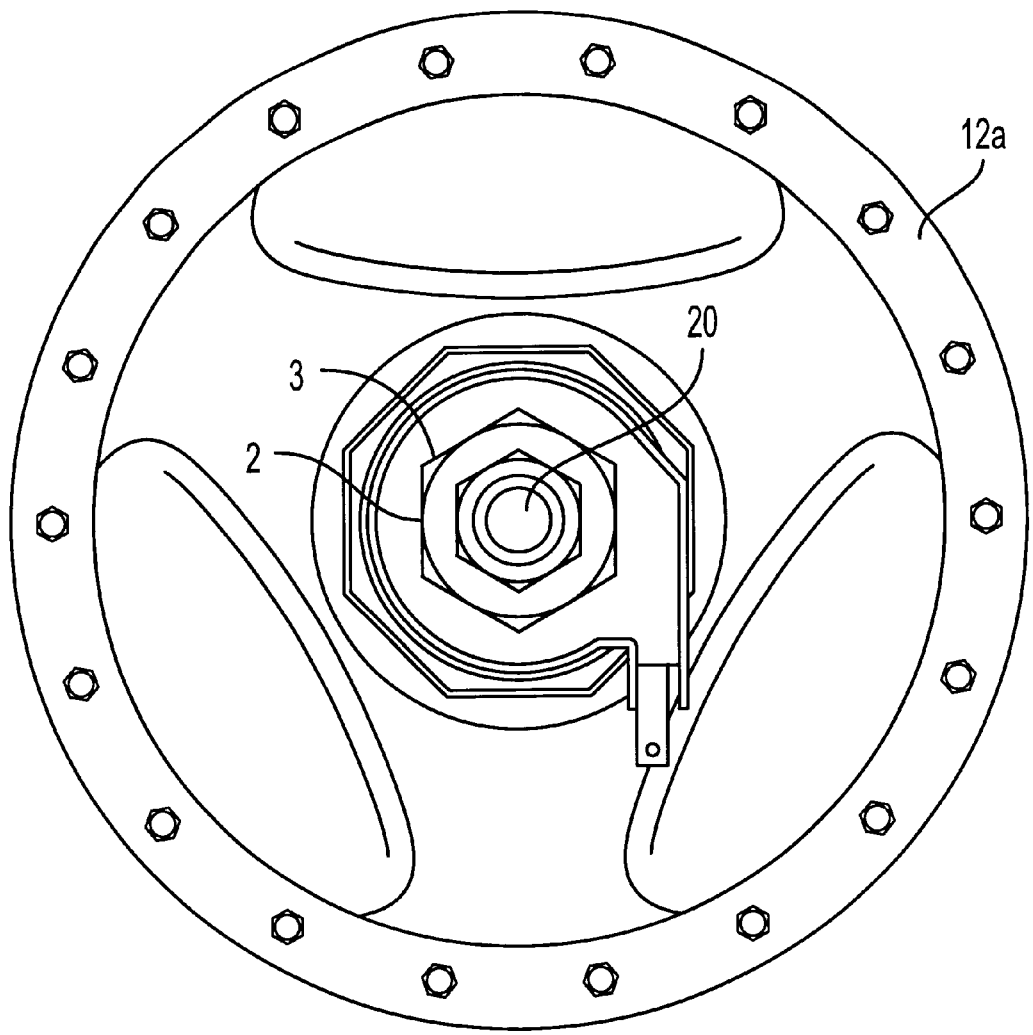
FIG. 2 is a view taken along line II—II in FIG. 1.
Figure 15:
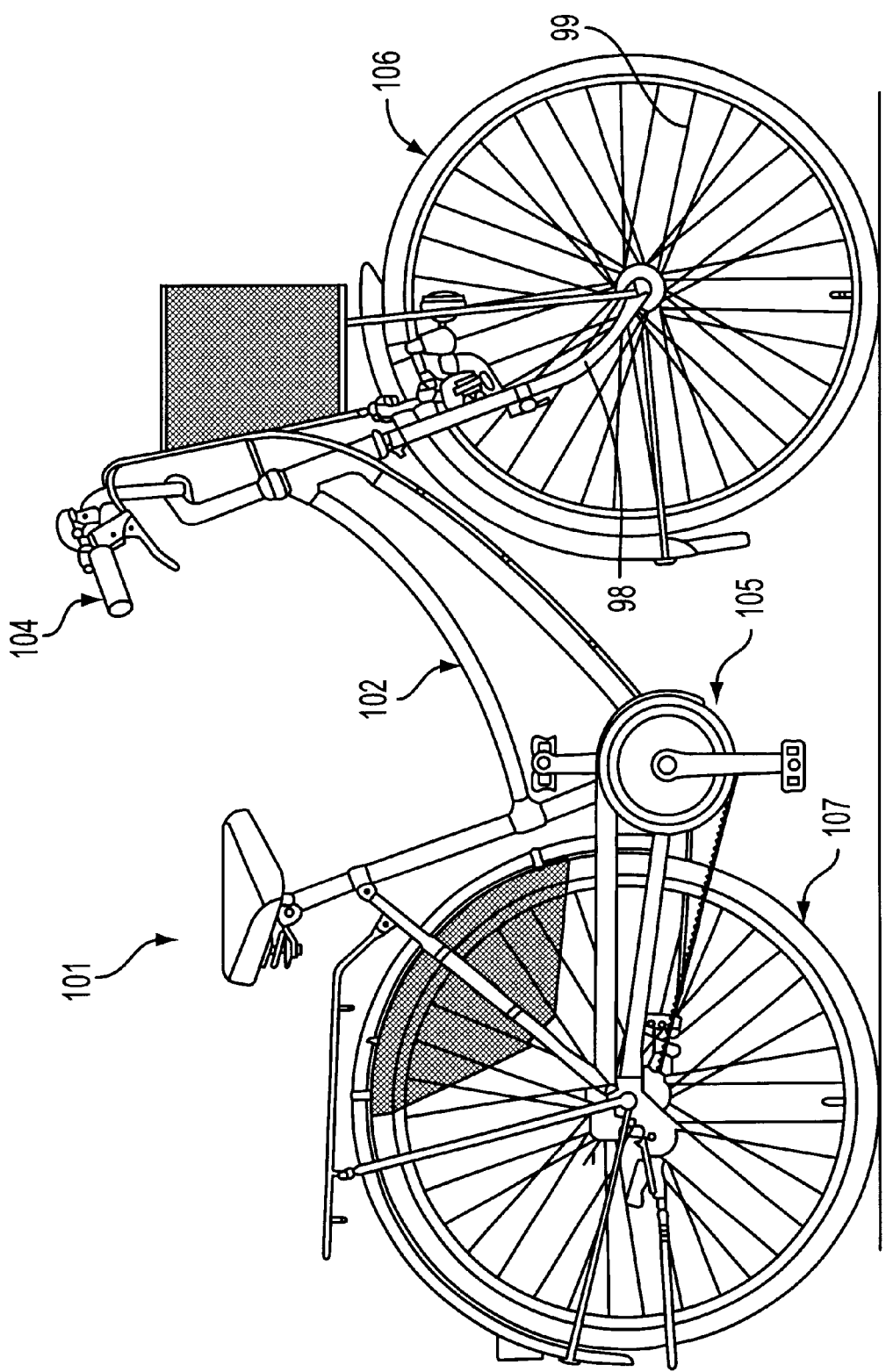
FIG. 15 is a side view of a particular embodiment of a bicycle that incorporates the dynamo shown in FIG. 1.

FIG. 1 is a partial cross-sectional view of a particular embodiment of a claw-pole dynamo 1 according to the present invention, FIG. 2 is a view taken along line II—II in FIG. 1, and FIG. 15 is a side view of a particular embodiment of a bicycle 101 that incorporates the dynamo 1 shown in FIG. 1. Bicycle 101 comprises a frame 102 having front-wheel forks 98; a handle 104; a drive unit 105 composed of a chain, pedals, and the like; a front wheel 106 having spokes 99; and a rear wheel 107. Power can be supplied to a headlamp, rear lamp, or the like by integrating the hub dynamo 1 into the bicycle 101 in the power generator.

The hub dynamo 1 shown in FIG. 1 is integrated into the hub of the front wheel 106 of the bicycle 101. More specifically, the two end portions of a hub axle 20 are fixed to the right and left front-wheel forks 98, and spokes 99 are fixed to the two flanges 11a and 12a of an external rotor assembly. The axis O-O shown in FIG. 1 is the axis of rotation of the front wheel 106 of the bicycle, and the external rotor assembly rotates together with the front wheel 106 about the axis O-O.

The hub dynamo 1 comprises an internal stator assembly and an external rotor assembly. The internal stator assembly (internal stator) comprises, as shown in FIG. 1, the hub axle 20, two stator yokes 31 and 32, a bobbin 41 with a wound coil 40, a cylindrical core yoke 50, and two separation disks 61 and 62 (see FIG. 8) integrated as shown in FIG. 1. The internal stator is fixed to the front wheel forks 98 by the hub axle 20. Both ends of the hub axle 20 are fixed to the front wheel forks 98 by clamp nuts 2 or lock nuts 3, and the stator yokes 31 and 32, cylindrical core yoke 50, and separation disks 61 and 62 are fixed to this hub axle 20. Each of the members constituting the internal stator assembly will be described in detail below.

The external rotor assembly (external rotor) comprises a first frame 11, a second frame 12, and a cap 13 integrated as shown in FIG. 1. The integrated external rotor assembly is rotatably fixed to the hub axle 20 with the aid of bearings 21 and 22. A plurality of spokes 99 of the front wheel 106 are fixed to a flange 11a formed on the outer peripheral portion of the first frame 11 and to a flange 12a formed on the outer peripheral portion of the second frame 12. A permanent magnet 14 comprising four magnets spaced at equal intervals in the circumferential direction is fixed to the cap 13, as shown in FIG. 1. In this permanent magnet 14, N and S poles are intermittently formed at equal intervals, and a total of 28 poles of each type face the yokes (pole shoes) 31b and 32b of the stator yokes 31 and 32 described below (see FIG. 11).

Figure 3:
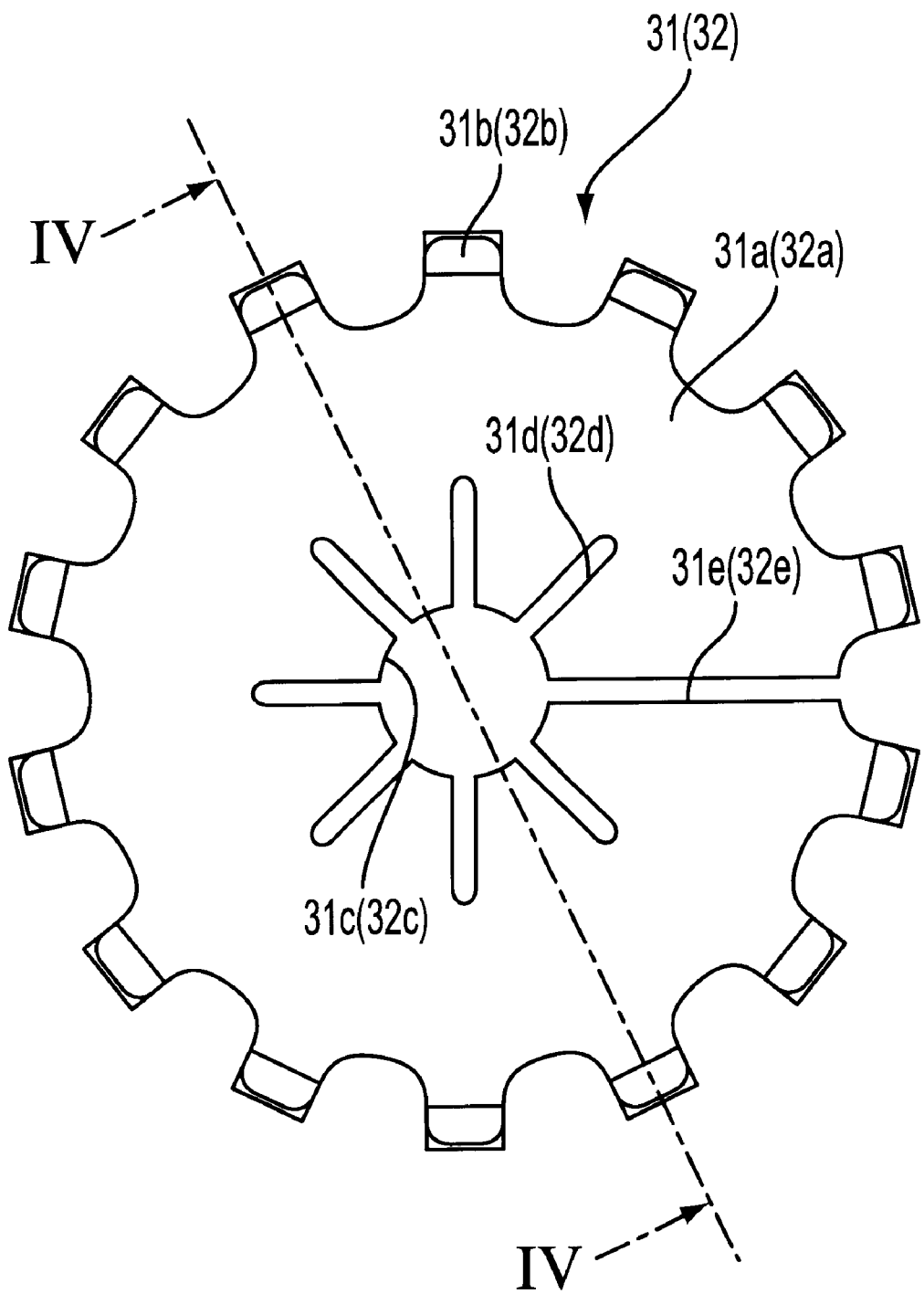
FIG. 3 is a plan view of a particular embodiment of a stator yoke according to the present invention.
Figure 4:
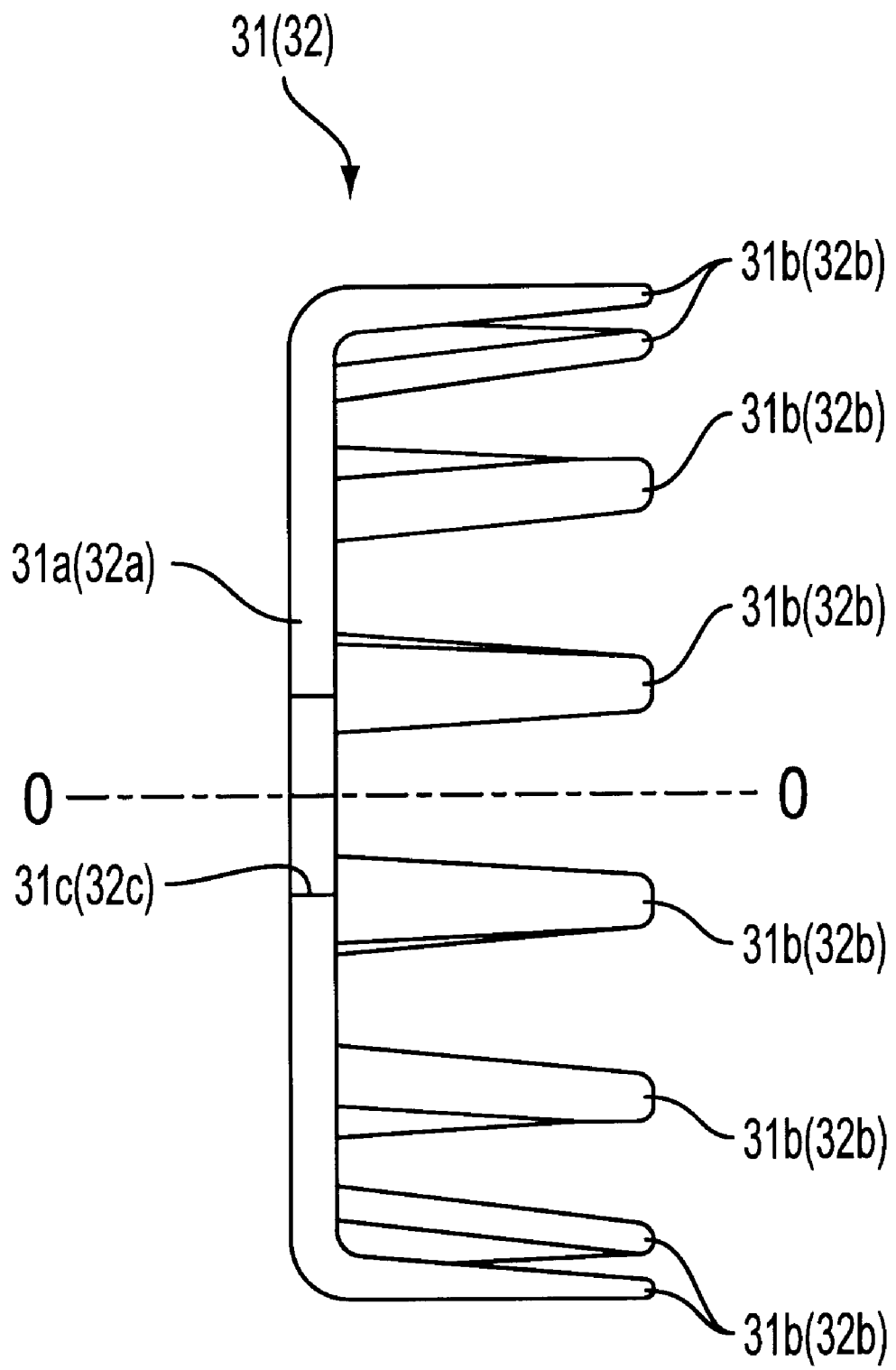
FIG. 4 is a view taken along line IV—IV in FIG. 3.
Figure 11:
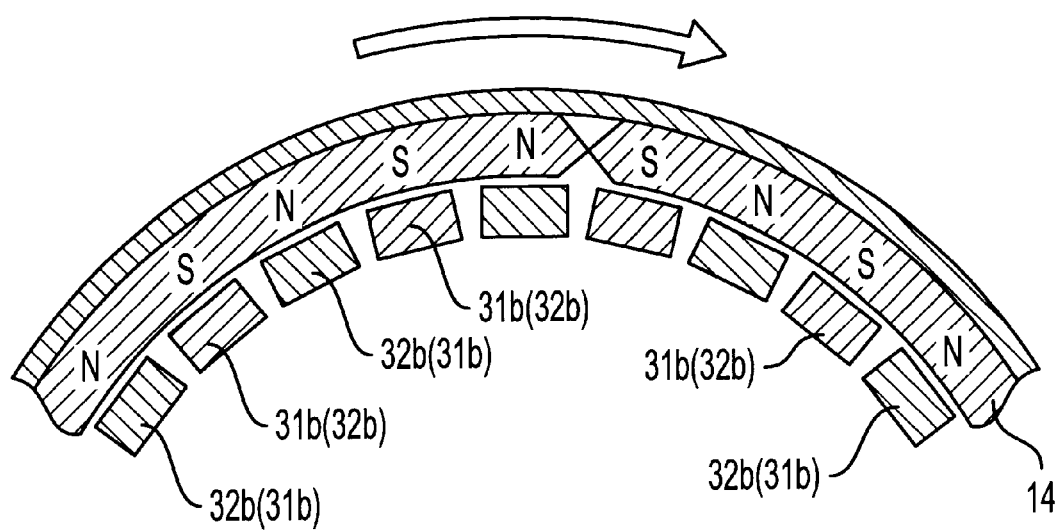
FIG. 11 is a cross-sectional view showing the relationship between the magnet and claw poles of the dynamo shown in FIG. 1.

FIG. 3 is a plan view of a particular embodiment of the stator yokes 31 and 32 according to the present invention, and FIG. 4 is a view taken along line IV—IV in FIG. 3. In this embodiment, the stator yoke 31/32 is made of high-machinability magnetic steel sheets (soft magnetic iron) based on pure iron. As shown in FIGS. 3 and 4, the stator yokes 31/32 comprises a disk portion 31a/32a and claws 31b/32b. More specifically, fourteen claws 31b/32b are formed at equal intervals in the circumferential direction, and these claws extend in the direction of the axis O-O from the outer peripheral end of the corresponding disk portion 31a/32a. The circumferential dimensions of the gaps between the claws 31b/32b are set somewhat larger than the circumferential dimensions of the claws 31 b/32b so that the claws 31b and 32b on the two assembled stator yokes 31/32 are positioned at equal intervals in the circumferential direction and equal gaps are formed therebetween, as shown in FIG. 11. As shown in FIG. 11, the permanent magnet 14 faces the outside of the claws 31b and 32b in the radial direction.

As shown in FIG. 3, the disk portion 31a/32a is provided with a round hole 31c/32c for insertion of the hub axle 20, and with slits 31d/32d and 31e/32e. The round hole 31c/32c is formed in the center of the disk portion 31a/32a. The slits 31d/32d extend radially outward from the round hole 31c/32c to the intermediate portion between the outer peripheral end of the disk portion 31a/32a and the round hole 31c/32c. The slit 31e/32e extends radially outward from the round hole 31c/32c to the outer peripheral end of the disk portion 31a/32a. The seven slits 31d/32d and one slit 31e/32e are arranged at equal intervals in the circumferential direction.

Figure 5:
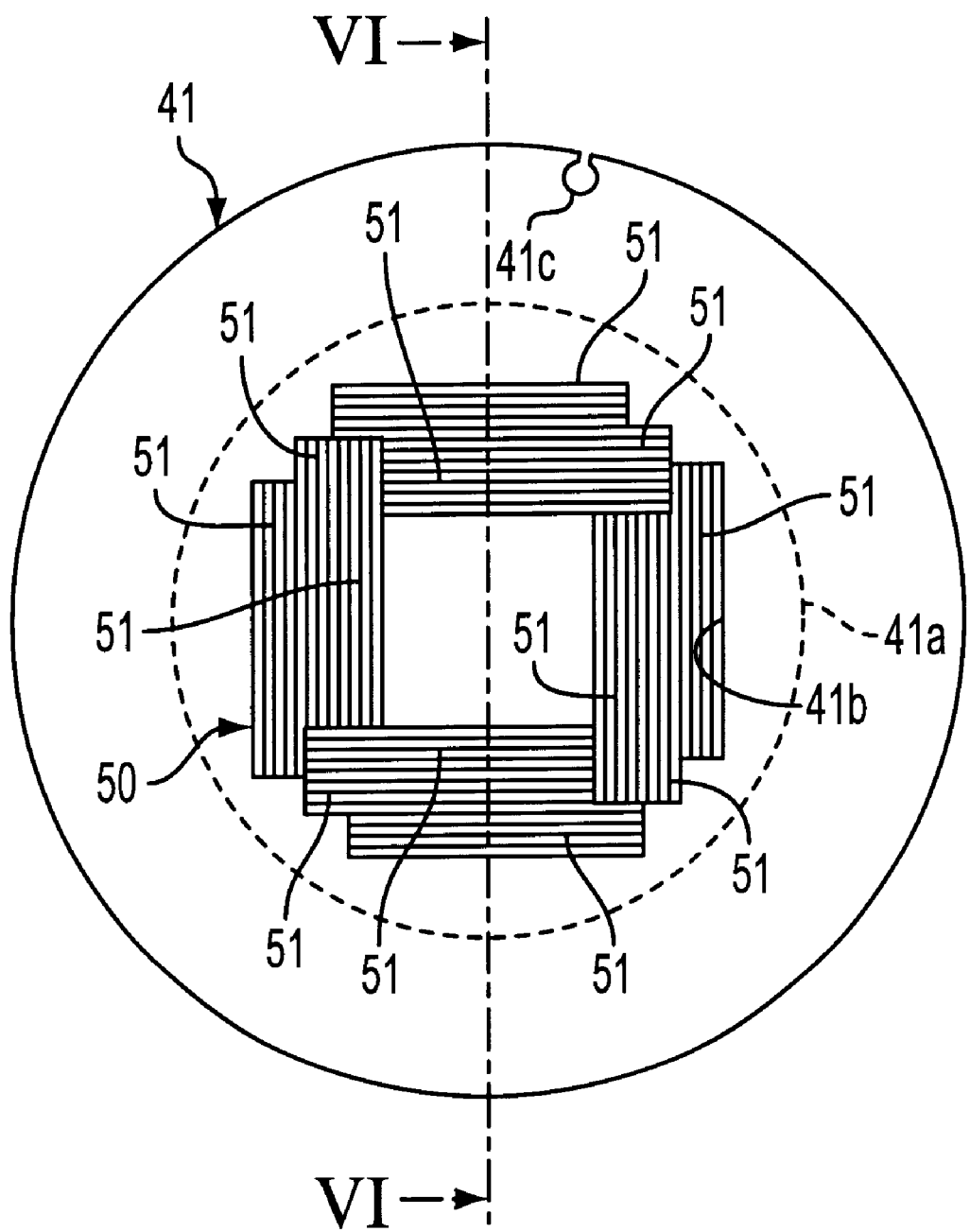
FIG. 5 is a plan view of particular embodiments of a bobbin and a core yoke according to the present invention.
Figure 6:
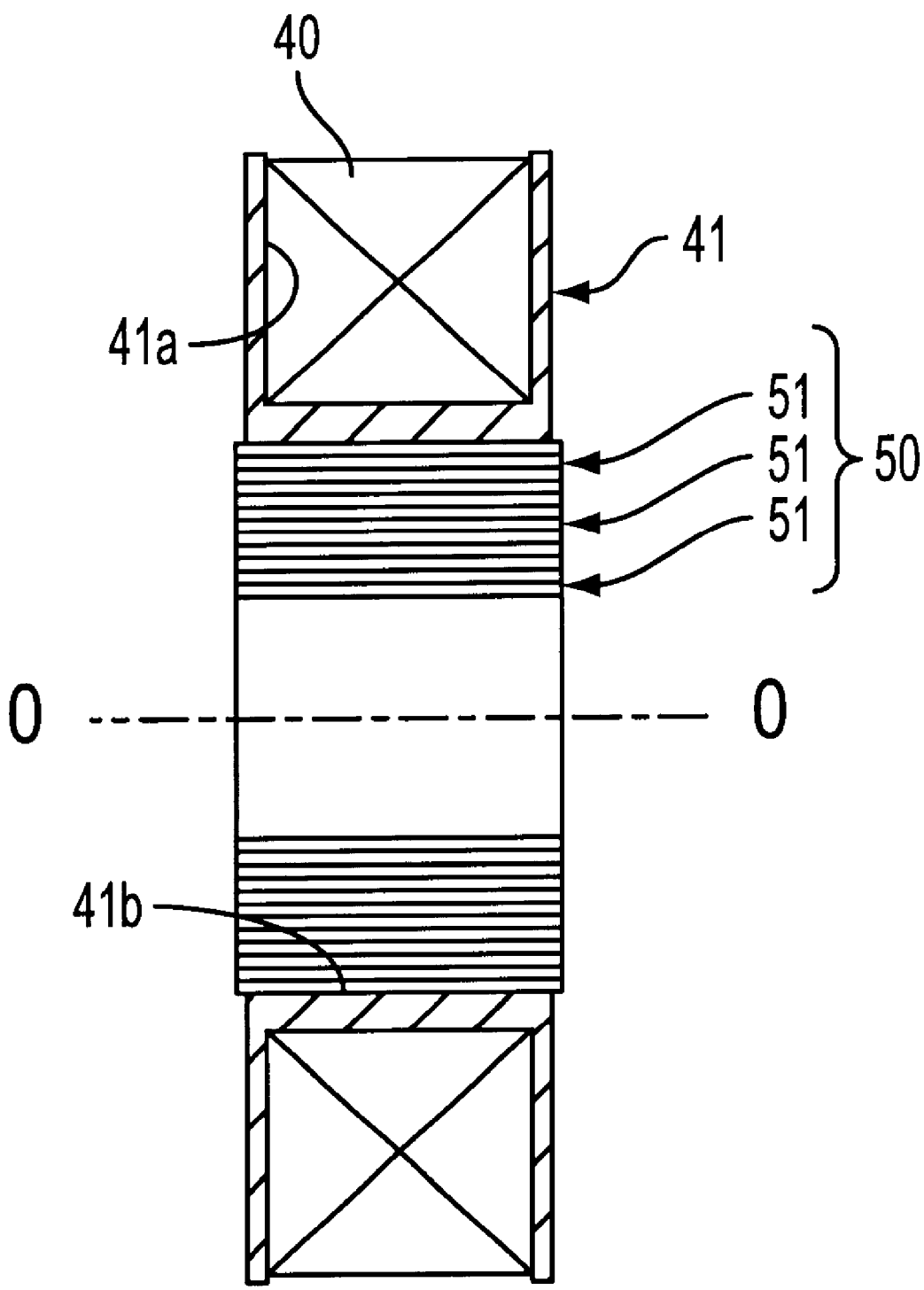
FIG. 6 is a view taken along line VI—VI in FIG. 5.

FIG. 5 is a plan view of particular embodiments of bobbin 41 and core yoke 50 according to the present invention, and FIG. 6 is a view taken along line VI—VI in FIG. 5. In this embodiment, the bobbin 41 is an annular resin member in which a groove 41a for winding and holding the coil 40 is wound on the outer peripheral portion, and a notch 41b having a stepped portion for engaging the cylindrical core yoke 50 is formed on the inner peripheral portion. The two ends of the coil 40 wound in the groove 41a are brought out through the hole 41c shown in FIG. 5 and through a hole (not shown) located on the opposite side in FIG. 5.

Figure 7:
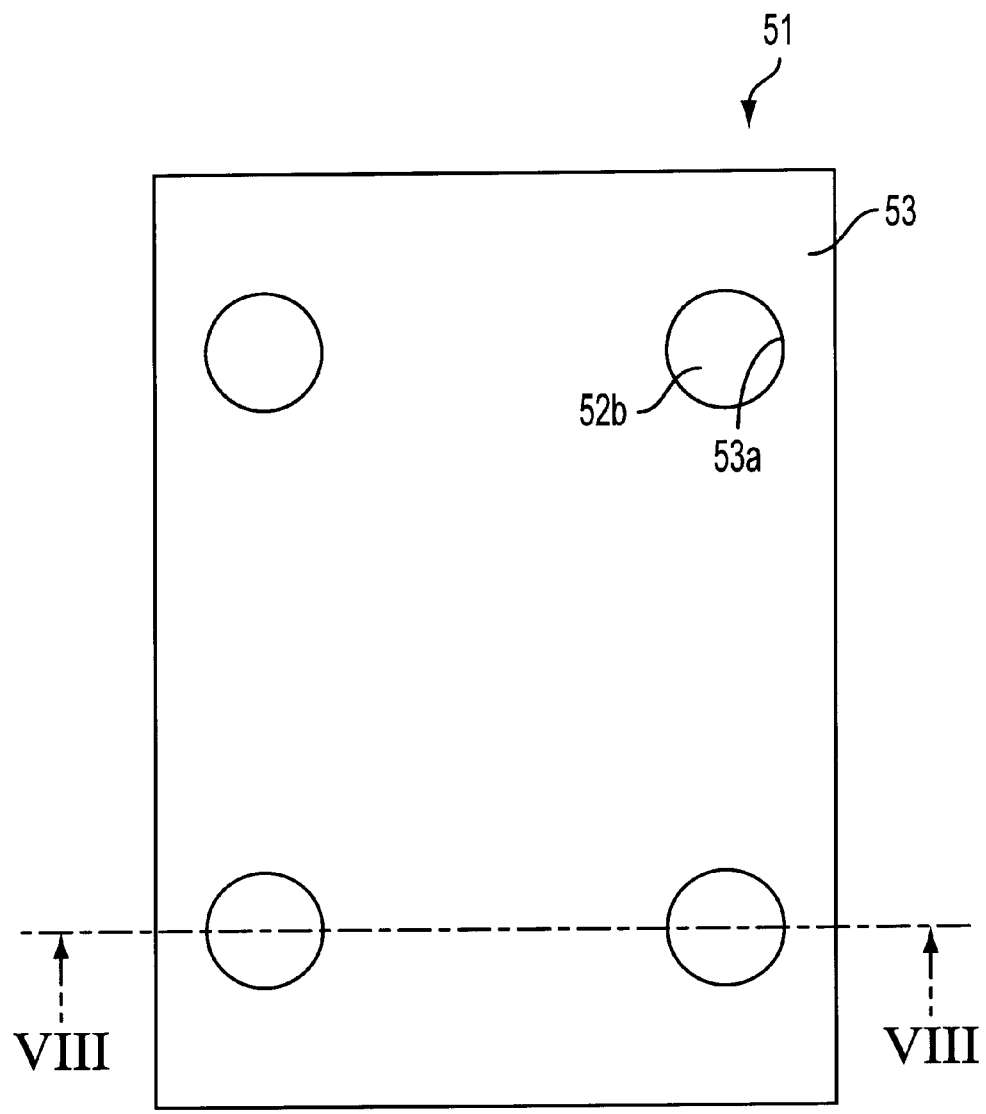
FIG. 7 is a plan view of a particular embodiment of a core yoke section according to the present invention.
Figure 8:
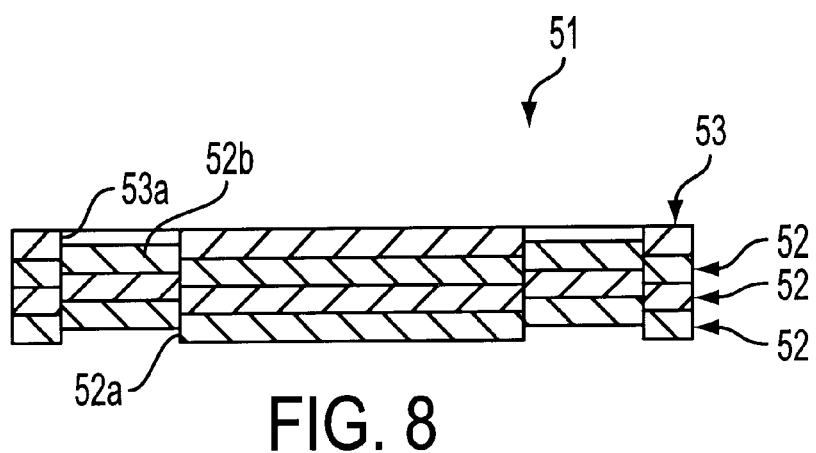
FIG. 8 is a view taken along line VIII—VIII of FIG. 7.

The cylindrical core yoke 50 includes 12 sectional assemblies 51 which engage the notch 41b of the bobbin 41 to achieve mounting inside this bobbin 41. Each of the sectional assemblies 51 is obtained by fitting together four sections shaped as rectangular thin sheets, as shown in FIGS. 7 and 8, wherein a single sectional assembly 51 comprises three sections 52 and one section 53. The sections 52 are provided with four concavities 52a and one convexity 52b, and the section 53 is provided with four round holes 53a. The concavities 52a and the convexity 52b are joined together, as are the round holes 53a and the convexity 52b, and are thus assembled into a sectional assembly 51 (see FIG. 8). Each of the sections 52 and 53 is manufactured from silicon-containing steel sheets with a thickness of 1 mm or less.

Fitting such sectional assemblies 51 into the notch 41b of the bobbin 41 in the manner shown in FIG. 5 will allow these 12 sectional assemblies 51 to form a cylindrical core yoke 50 provided with an internal space that is square in cross section and that accommodates the hub axle 20. The cylindrical core yoke 50 is obtained by stacking the sections 52 and 53 parallel to the direction of the axis O-O. As shown in FIG. 6, the length of the cylindrical core yoke 50 in the direction of the axis O-O is greater than the length of the bobbin 41 in the direction of the axis O-O, thus creating a situation in which the two end faces of the cylindrical core yoke 50 extend somewhat beyond the two end faces of the bobbin 41.

Figure 9:
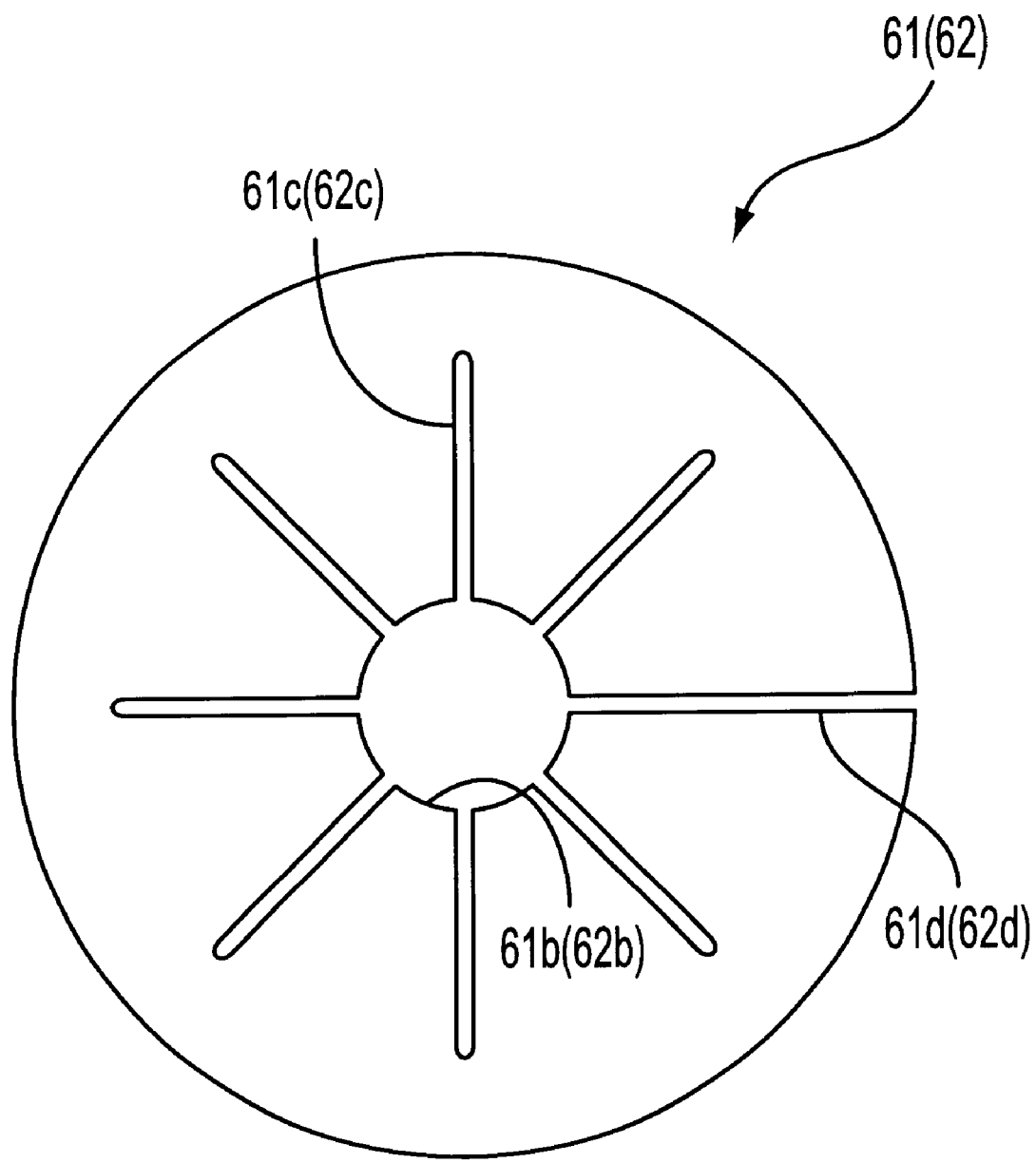
FIG. 9 is a plan view of a particular embodiment of a separation disk according to the present invention.

FIG. 9 is a plan view of a particular embodiment of a separation disk 61 or 62 according to the present invention. In this embodiment, the separation disks 61/62 are fabricated from silicon-containing steel sheets having the same thickness as the sections 52 and 53. The separation disks 61/62 are provided with round holes 61b/62b for insertion of the hub axle 20, and with slits 61c/62c and 61d/62d. The round holes 61b/62b are formed in the center and have substantially the same diameter as the round holes 31c/32c of the stator yokes 31/32. The slits 61c/62c extend radially outward from the round holes 61b/62b to the area in the vicinity of the outer peripheral ends. The slits 61d/62d extend radially outward from the round holes 61b/62b to the outer peripheral ends. These seven slits 61c/62c and one slit 61d/62d are arranged at equal intervals in the circumferential direction.

Figure 10:
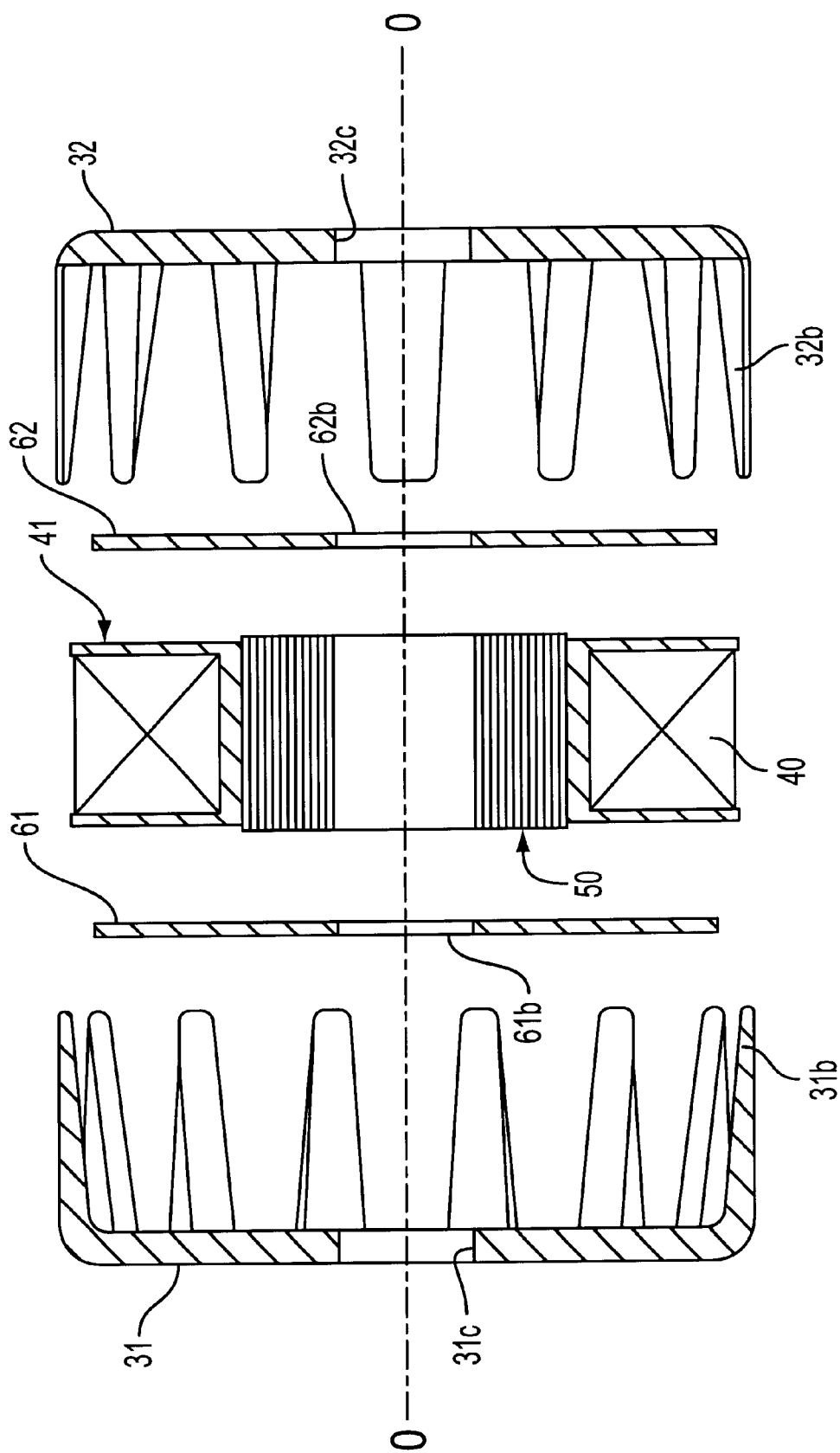
FIG. 10 is an exploded cross-sectional view of the stator yoke, core yoke and separation disks used in the dynamo shown in FIG. 1.

As shown in FIG. 10, the separation disks 61/62 is positioned between the stator yokes 31/32 and the bobbin 41/cylindrical core yoke 50 in a sandwich configuration. In the assembled state shown in FIG. 1, the separation disks 61/62 separate the cylindrical core yoke 50 and the disk portions 31a/32a of the stator yokes 31/32 while in contact therewith, such that direct contact between the two is prevented. When the silicon-containing steel sheets are assembled in order to accommodate the magnetic flux, the two stator yokes 31 and 32 will assume a state in which the inner peripheral portions thereof are magnetically coupled with each other through the agency of the cylindrical core yoke 50 and the separation disks 61 and 62. In addition, the slits 61c/62c and 61d/62d are designed narrower than the slits 31d/32d and 31e/32e of the stator yokes 31/32 to ensure that the cylindrical core yoke 50 and the stator yokes 31/32 are separated in a more secure fashion. A small gap exists between the bobbin 41 and the separation disks 61 and 62 because the two end faces of the cylindrical core yoke 50 extend somewhat beyond the two end faces of the bobbin 41, as shown in FIGS. 6 and 10.

Generation of power by the hub dynamo 1 will now be described.

When the spokes 99 are rotated in relation to the front wheel forks 98 of a moving bicycle 101, the external rotor assembly, which is fixed to the spokes 99 and is allowed to rotate on the bearings 21 and 22 in relation to the internal stator assembly fixed to the front wheel forks 98, rotates in relation to the internal stator assembly. When this happens, the permanent magnet 14 rotates around the outside of the claws 31b and 32b of the stator yokes 31 and 32 (see FIG. 11). Due to this arrangement, one of the claws 31b and 32b receives a magnetic flux from an S or N pole of the permanent magnet 14 when the other receives a magnetic flux from an N or S pole, respectively. More specifically, the permanent magnet 14 rotating on the outside of the claws 31b and 32b causes a first state, in which the stator yoke 31 acts as an N pole and the stator yoke 32 acts as an S pole, and a second state, in which the stator yoke 31 acts as an S pole and the stator yoke 32 acts as an N pole, to occur repeatedly, thus inducing an alternating magnetic flux in the direction of the axis O-O in the cylindrical core yoke 50, to which the two yokes 31 and 32 are magnetically coupled.

A current is produced in the coil 40, and power is generated by the alternating magnetic flux produced on the inside of the coil 40. More specifically, an alternating magnetic flux is induced and power is generated in the cylindrical core yoke 50 that is disposed inside the coil 40 and that links the two stator yokes 31 and 32. However, an eddy current is induced in addition to the alternating magnetic flux during such power generation. Such an eddy current lowers the power generation efficiency, but this current can be suppressed in the present hub dynamo 1 because the slits 31d/32d and 31e/32e are provided to the disk portions 31a/32a of the stator yokes 31/32. More specifically, an eddy current is induced in the disk portions 31a/32a in the circumferential direction, but the presence of the slits 31d/32d and 31e/32e, which extend radially outward from the round holes 61b/62b, breaks the main path of the eddy current, thus making it more difficult for the current to flow through the disk portions 31a/32a in the circumferential direction. The eddy current is therefore reduced, and the power generation efficiency is enhanced. The efficiency with which the eddy current is reduced in this embodiment is high because the slits 31d/32d and 31e/32e are centered around the inner peripheral part of the disk portion 31a/32a, which is characterized by strong eddy currents. The eddy current be reduced with even higher efficiency because a plurality of slits 31d/32d are provided.

Experiments were conducted to compare the power output produced when the external rotor assembly and the internal stator assembly rotated in relation to each other at 110 rpm, which corresponded to a case in which the bicycle 101 was traveling at a speed of 15 km/h. It was found that the power output of the hub dynamo 1 had increased about 26% over that produced when the slits 31d/32d and 31e/32e were dispensed with, and about 6% over that produced when the slits 31e/32e (but not the slits 31d/32d) were formed.

In this embodiment, the stator yoke 32 is fabricated from magnetic steel sheets based on pure iron that are easier to machine than carbonaceous materials, thus making it easier to mold the curved portions of the disk portion 31a/32a and the claw 31b/32b. This, in turn results in lower manufacturing costs. On the other hand, fabricating the stator yoke 32 from magnetic steel sheets based on pure iron in such a manner reduces electric resistance and increases iron loss due to an eddy current, but providing the disk portion 31a/32a with the slits 31d/32d and 31e/32e suppresses the eddy current and makes it possible to maintain the desired power generation efficiency.

Additionally, the eddy current induced during power generation is inhibited and the power generation efficiency is increased because a separation disk 61/62 is placed between the stator yoke 31/32 and the cylindrical core yoke 50. More specifically, an eddy current is induced in the stator yokes 31/32 and the cylindrical core yoke 50 due to the formation of an alternating magnetic flux, but since separation disks 61/62 made of high-resistance, silicon-containing magnetic steel sheets are interposed therebetween, it is possible to reduce the eddy current induced in the area between the stator yokes 31/32 and the cylindrical core yoke 50. The eddy current is therefore reduced, and higher power generation efficiency is achieved. Also, providing the separation disk 61/62 with the slits 61c/62c and 61d/62d makes it more difficult for an eddy current to flow through the separation disk 61/62. The eddy current is thus reduced even further, raising the power generation efficiency.

Experiments were also conducted to compare the power outputs produced when the external rotor assembly and the internal stator assembly rotated in relation to each other at 120 rpm, which corresponded to a case in which the bicycle 101 was traveling at a speed of 15 km/h. It was found that the power output of the hub dynamo 1 was about 6% higher than that produced when the separation disks 61 and 62 were dispensed with.

Additionally, the eddy current is suppressed and the power generation efficiency is increased because the cylindrical core yoke 50 comprises a plurality of sections 52 and 53. More specifically, an eddy current is induced in the cylindrical core yoke 50 by the creation of an alternating magnetic flux, but the magnitude of this eddy current is reduced because the sections 52 and 53 are placed at different positions in the circumferential direction, and the areas separating these sections 52 and 53 are introduced such that an eddy current flowing in the circumferential direction are disrupted. This makes it more difficult for the eddy current to flow through the cylindrical core yoke 50 in the circumferential direction, reduces the eddy current, and raises the power generation efficiency. In this embodiment, the sections 52 and 53 comprising the cylindrical core yoke 50 are fabricated from silicon-containing magnetic steel sheets, so the cylindrical core yoke 50 has higher electric resistance and the eddy current induced in the cylindrical core yoke 50 are further reduced. As noted above, the cylindrical core yoke 50 is made from sectional assemblies 51 obtained by superposing and integrating in advance four thin-sheet sections 52 and 53. This facilitates assembly and makes it possible to improve installation during the final assembly of the hub dynamo 1. Additionally, it is more difficult for the sections 52 and 53 to shift in relation to each other because the sections 52 are provided with concavities 52a and a convexity 52b, and the section 53 is provided with round holes 53a, and these are used to form the sectional assembly 51.

Experiments were conducted to compare the power outputs produced when the external rotor assembly and the internal stator assembly rotated in relation to each other at 120 rpm, which corresponded to a case in which the bicycle 101 was traveling at a speed of 15 km/h. It was found that the power output of the hub dynamo 1 had increased about 33% over that produced when the cylindrical core yoke 50 was made of undivided cylindrical magnetic soft iron (magnetic steel sheets based on pure iron).

Figure 12:
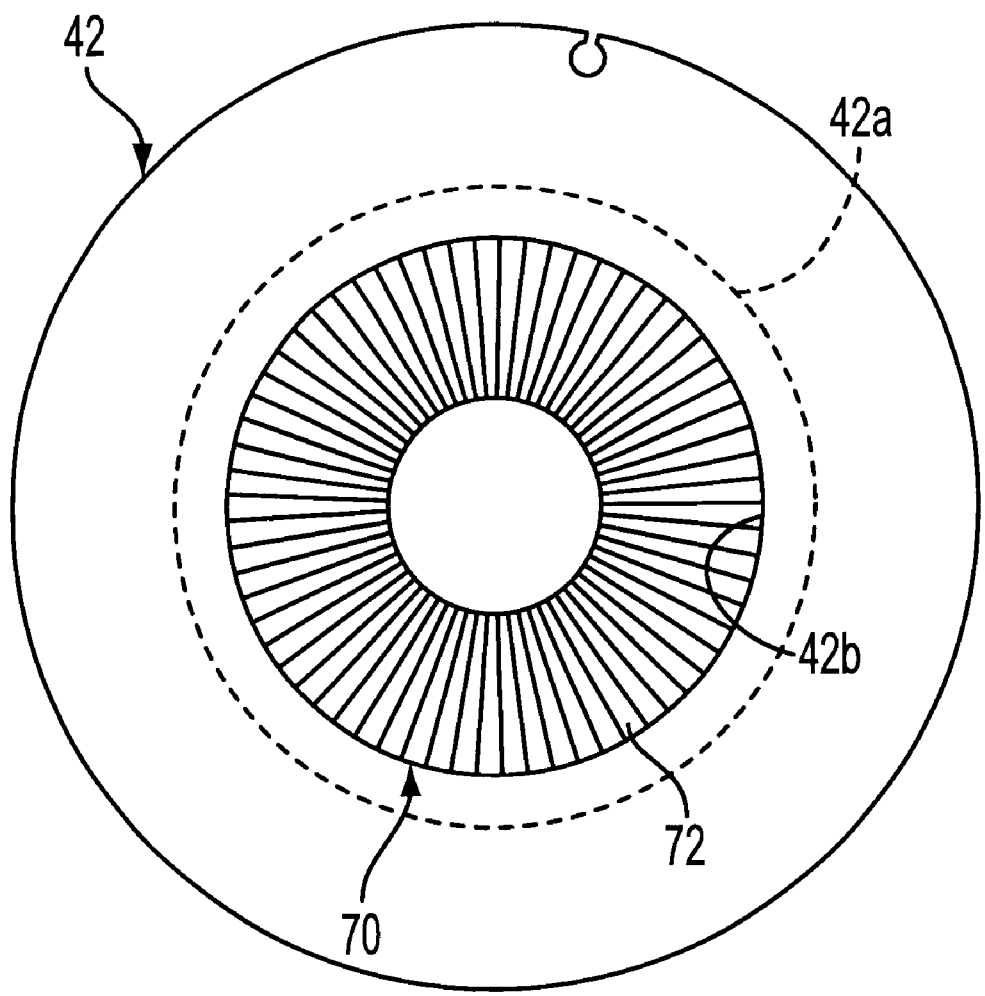
FIG. 12 is a plan view of alternative embodiments of a bobbin and a core yoke according to the present invention.

In the first embodiment described above, sectional assemblies 51 comprising a plurality of sections 52 and 53 were stacked parallel to the direction of the axis O-O to obtain a cylindrical core yoke 50, but it is also possible to replace the cylindrical core yoke 50 with a cylindrical core yoke 70 such as that shown in FIG. 12. In the cylindrical core yoke 70, 190 thin silicon-containing steel sheets (sections) 72 are aligned in the circumferential direction, as shown in FIG. 12 (for easier understanding, a smaller number of sections is shown in FIG. 12). Placing them inside a bobbin 42 yields a centrally located space for accommodating a hub axle 20.

The bobbin 42 with a wound coil 40 is provided with a cylindrical space enclosed within a circumferential surface 42b along the inner peripheral portion thereof such that engagement with the cylindrical core yoke 70 is achieved. The outer peripheral surface of the cylindrical core yoke 70 is caused to engage the inner peripheral surface 42b of the bobbin 42. The coil 40 is wound inside a groove 42a formed in the outer peripheral portion of the bobbin 42.

Since the hub dynamo of the present embodiment has radially extending thin sheets 72, the areas separating adjacent thin sheets 72 prevent the circumferential flow of the eddy currents moving in the circumferential direction inside the cylindrical core yoke 70. The eddy currents flowing through the cylindrical core yoke 70 are therefore inhibited, and the power generation efficiency is raised. The extent to which power generation efficiency is improved is the same as in the case of the above-described hub dynamo 1 of the first embodiment.

Figure 13:
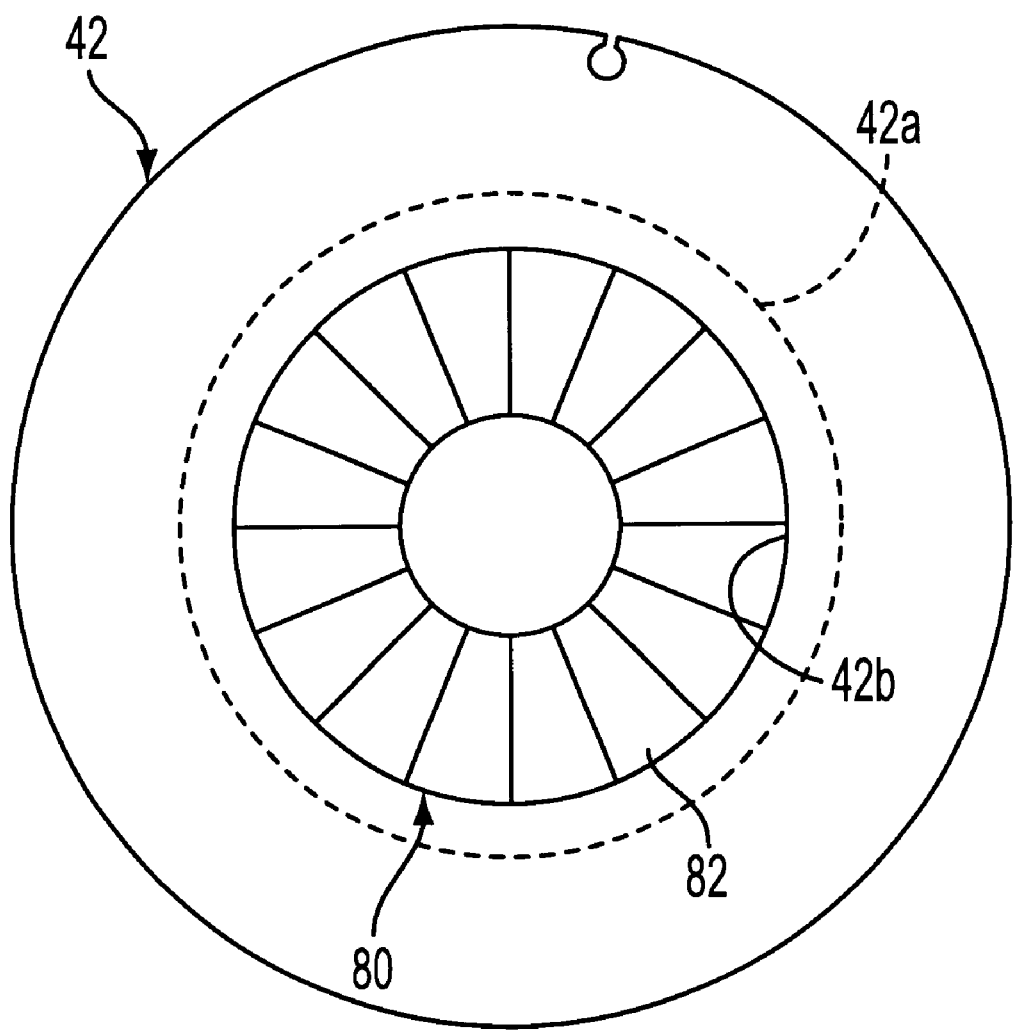
FIG. 13 is a plan view of additional alternative embodiments of a bobbin and a core yoke according to the present invention.

In the first embodiment described above, the sectional assemblies 51 composed of a plurality of sections 52 and 53 were stacked parallel to the direction of the axis O-O to produce a cylindrical core yoke 50, but it is also possible to replace the cylindrical core yoke 50 with a cylindrical core yoke 80 such as that shown in FIG. 13. In the cylindrical core yoke 80, 16 magnetic soft iron blocks 82 are aligned in the circumferential direction, as shown in FIG. 13. Placing them inside a bobbin 42 yields a centrally located space for accommodating a hub axle 20.

The bobbin 42 with a wound coil 40 is provided with a cylindrical space enclosed within a circumferential surface 42b along the inner peripheral portion thereof such that engagement with the cylindrical core yoke 80 is achieved. The outer peripheral surface of the cylindrical core yoke 80 is caused to engage the inner peripheral surface 42b of the bobbin 42. The coil 40 is wound inside a groove 42a formed in the outer peripheral portion of the bobbin 42.

In the hub dynamo of this embodiment, the areas separating adjacent blocks 82 extend in a radial configuration in the manner shown in FIG. 13, inhibiting the circumferential flow of the eddy currents moving in the circumferential direction inside the cylindrical core yoke 80. The eddy currents flowing through the cylindrical core yoke 80 are therefore inhibited, and the power generation efficiency is raised.

Experiments were conducted to compare the power outputs produced when the external rotor assembly and the internal stator assembly rotated in relation to each other at 120 rpm, which corresponded to a case in which the bicycle 101 was traveling at a speed of 15 km/h. It was found that the power output of this hub dynamo had increased about 29% over that produced when the cylindrical core yoke 80 was composed of undivided cylindrical magnetic soft iron (magnetic steel sheets based on pure iron).

Figure 14:
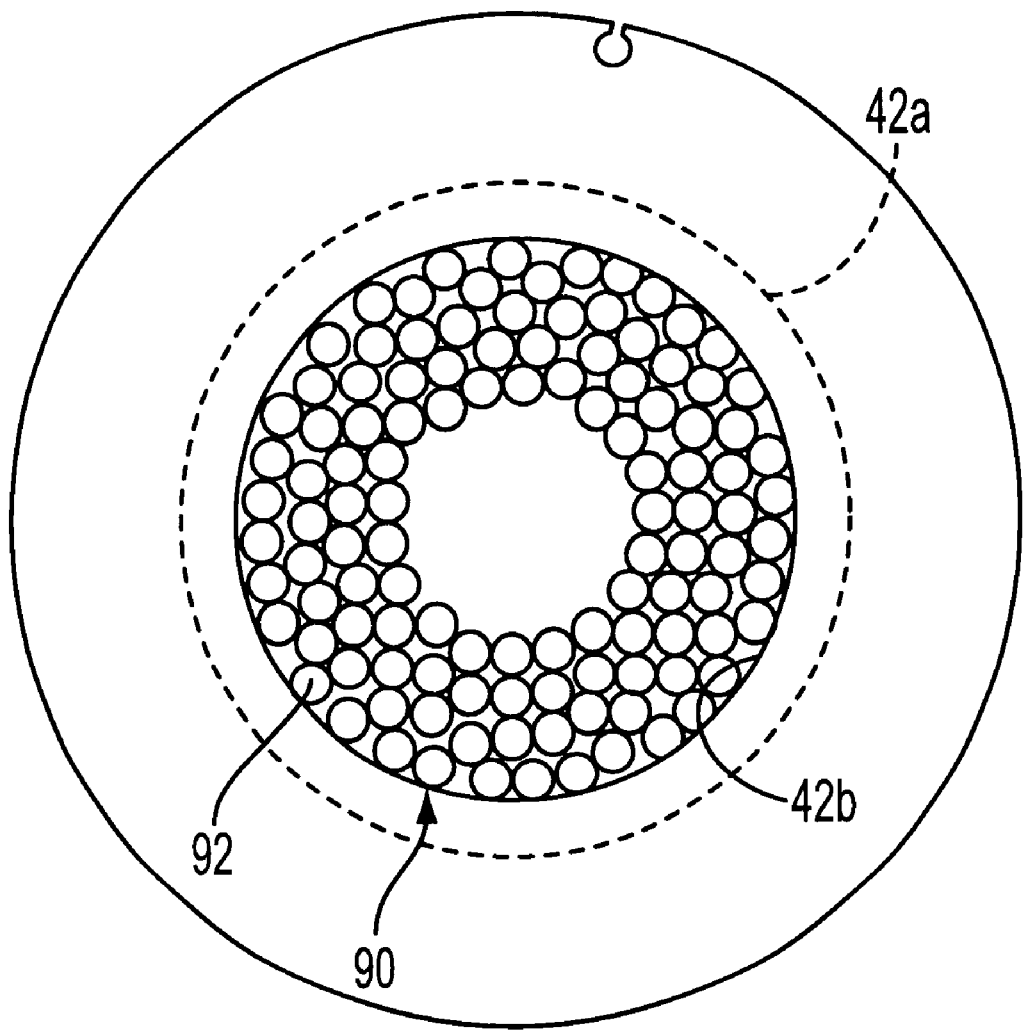
FIG. 14 is a plan view of additional alternative embodiments of a bobbin and a core yoke according to the present invention.

In the first embodiment described above, sectional assemblies 51 comprising a plurality of sections 52 and 53 were stacked parallel to the direction of the axis O-O to obtain a cylindrical core yoke 50, but it is also possible to replace the cylindrical core yoke 50 with a cylindrical core yoke 90 such as that shown in FIG. 14. In the cylindrical core yoke 90, about 100 magnetic soft iron rods 92 extending in the direction of the axis O-O are bundled in the circumferential direction, as shown in FIG. 14. Placing them inside a bobbin 42 yields a centrally located space for accommodating a hub axle 20.

The bobbin 42 with a wound coil 40 is provided with a cylindrical space enclosed within a circumferential surface 42b along the inner peripheral portion thereof such that engagement with the cylindrical core yoke 90 is achieved. The outer surface of the cylindrical core yoke 90 is caused to engage the inner peripheral surface 42b of the bobbin 42. The coil 40 is wound inside a groove 42a formed in the outer peripheral portion of the bobbin 42.

Because of the structure of the cylindrical yoke 90 in the hub dynamo of the present embodiment, a magnetic flux can easily propagate in the direction of the axis O-O, but the flow of eddy currents in the circumferential direction is impaired. The eddy currents flowing through the cylindrical core yoke 90 are thus inhibited, and the power generation efficiency is increased.

Experiments were conducted to compare the power outputs produced when the external rotor assembly and the internal stator assembly rotated in relation to each other at 120 rpm, which corresponded to a case in which the bicycle 101 was traveling at a speed of 15 km/h, and it was found that the power output of this hub dynamo had increased about 18% over that produced when the cylindrical core yoke 90 was composed of undivided cylindrical magnetic soft iron (magnetic steel sheets based on pure iron).

While the above is a description of various embodiments of the present invention, further modifications may be employed without departing from the spirit and scope of the present invention. For example, the size, shape, location or orientation of the various components may be changed as desired. The functions of one element may be performed by two, and vice versa. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus on a particular structure or feature.

What is claimed is:

1. A claw pole dynamo comprising:
   an annular member having a magnet extending in a circumferential direction thereof for rotation around an axis;
   a first stator yoke having a first annular portion and a plurality of first pole shoes extending in a direction of the axis and in close proximity to the magnet;
   a second stator yoke having a second annular portion and a plurality of second pole shoes extending in the direction of the axis and in close proximity to the magnet;
   wherein the plurality of first pole shoes are interleaved with the plurality of second pole shoes in the circumferential direction;
   a core yoke for magnetically coupling the first stator yoke and the second stator yoke and for transmitting a magnetic flux in the direction of the axis;
   a coil disposed around the core yoke; and
   a first separation member formed of metal disposed between the first stator yoke and the core yoke.

2. The dynamo according to claim 1 wherein the first separation member defines a plurality of first discontinuities in a circumferential direction thereof.

3. The dynamo according to claim 2 wherein the first separation member comprises a first separation plate defining a plurality of first slits forming the plurality of first discontinuities.

4. The dynamo according to claim 3 wherein the first separation plate comprises a silicon-containing magnetic steel.

5. The dynamo according to claim 4 wherein the first separation plate has a disk shape, and wherein the plurality of first slits extend radially outwardly.

6. The dynamo according to claim 5 wherein at least one of the plurality of first slits extends to an outer peripheral edge of the first separation plate.

7. The dynamo according to claim 1 further comprising a second separation member disposed between the second stator yoke and the core yoke.

8. The dynamo according to claim 7 wherein the first separation member defines a plurality of first discontinuities in a circumferential direction thereof; and wherein the second separation member defines a plurality of second discontinuities in a circumferential direction thereof.

9. The dynamo according to claim 8 wherein the first separation member comprises a first separation plate defining a plurality of first slits forming the plurality of first discontinuities; and wherein the second separation member comprises a second separation plate defining a plurality of second slits forming the plurality of second discontinuities.

10. The dynamo according to claim 9 wherein the first separation plate and the second separation plate each comprise a silicon-containing magnetic steel.

11. The dynamo according to claim 10 wherein each of the first separation plate and the second separation plate has a disk shape, wherein the plurality of first slits extend radially outwardly, and wherein the plurality of second slits extend radially outwardly.

12. The dynamo according to claims 11 wherein at least one of the plurality of first slits extends to an outer peripheral edge of the first separation plate.

13. The dynamo according to claim 12 wherein at least one of the plurality of second slits extends to an outer peripheral edge of the second separation plate.

14. The dynamo according to claim 7 wherein the second separation member is formed of metal.

15. The dynamo according to claim 14 wherein the first separation member includes a radially extending first discontinuity, and wherein the second separation member includes a radially extending second discontinuity.

16. The dynamo according to claim 15 wherein the first separation member comprises a first separation plate having a disk shape, and wherein the second separation member comprises a second separation plate having a disk shape.

17. The dynamo according to claim 16 wherein the first separation plate has a first central opening, wherein the first discontinuity extends radially outwardly from the central opening, wherein the second separation plate has a second central opening, and wherein the second discontinuity extends radially outwardly from the second central opening.

18. The dynamo according to claim 17 wherein the first discontinuity extends to an outer peripheral edge of the first separation plate, and wherein the second discontinuity extends to an outer peripheral edge of the second separation plate.

19. The dynamo according to claim 18 wherein the first separation plate defines a first slit forming the first discontinuity, and wherein the second separation plate defines a second slit forming the second discontinuity.

20. The dynamo according to claim 1 wherein the annular member comprises a cylinder forming an external rotor, wherein the magnet extends around an inner peripheral surface of the annular member, wherein the first stator yoke, the second stator yoke, the core yoke and the coil are disposed coaxially within the cylinder and form an internal stator.

21. The dynamo according to claim 20 wherein the plurality of first pole shoes extend in the direction of the axis from an outer peripheral edge of the first annular portion, wherein the plurality of second pole shoes extend in the direction of the axis from an outer peripheral edge of the second annular portion, and wherein the core yoke magnetically couples an inner peripheral portion of the first annular portion with an inner peripheral portion of the second annular portion.

22. The dynamo according to claim 21 wherein the internal stator is fixed to a hub axle of a bicycle wheel, and wherein the external rotor is coupled to a rotating portion of the bicycle wheel.

23. The dynamo according to claim 1 wherein the first separation member includes a radially extending discontinuity.

24. The dynamo according to claim 23 wherein the first separation member comprises a first separation plate having a disk shape.

25. The dynamo according to claim 24 wherein the first separation plate has a central opening, and wherein the discontinuity extends radially outwardly from the central opening.

26. The dynamo according to claim 25 wherein the discontinuity extends to an outer peripheral edge of the first separation plate.

27. The dynamo according to claim 26 wherein the first separation plate defines a slit forming the discontinuity.

28. The dynamo according to claim 1 wherein the core yoke includes a plurality of sections disposed at different positions in a circumferential direction of the core yoke.

29. The dynamo according to claim 28 wherein the annular member comprises a cylinder forming an external rotor, wherein the magnet extends around an inner peripheral surface of the annular member, wherein the first stator yoke, the second stator yoke, the core yoke and the coil are disposed coaxially within the cylinder and form an internal stator.

30. The dynamo according to claim 29 wherein the plurality of first pole shoes extend in the direction of the axis from an outer peripheral edge of the first annular portion, wherein the plurality of second pole shoes extend in the direction of the axis from an outer peripheral edge of the second annular portion, and wherein the core yoke magnetically couples an inner peripheral portion of the first annular portion with an inner peripheral portion of the second annular portion.

31. The dynamo according to claim 30 wherein the internal stator is fixed to a hub axle of a bicycle wheel, and wherein the external rotor is coupled to a rotating portion of the bicycle wheel.

32. The dynamo according to claim 28 wherein the plurality of sections comprise silicon-containing magnetic steel.

33. The dynamo according to claim 28 wherein the plurality of sections comprise a plurality of sheet members.

34. The dynamo according to claim 33 wherein the plurality of sheet members are stacked in parallel in the direction of the axis.

35. The dynamo according to claim 28 wherein the plurality of sections are interlocked.

36. The dynamo according to claim 35 wherein the plurality of sections include a plurality of convexities that engage a plurality of concavities.

37. The dynamo according to claim 28 wherein at least one of the plurality of sections includes a hole for engaging a convexity on another one of the plurality of sections.

38. The dynamo according to claim 28 wherein the core yoke includes a bobbin on which the coil is wound, and wherein the plurality of sections are disposed at an inner peripheral portion of the bobbin.

39. The dynamo according to claim 38 wherein the plurality of sections engage a plurality of notches formed on the inner peripheral portion of the bobbin.

40. The dynamo according to claim 28 wherein the plurality of sections comprise a plurality of radially extending members.

41. The dynamo according to claim 40 wherein the plurality of sections comprise a plurality of radially extending sheets.

42. The dynamo according to claim 40 wherein the plurality of sections comprise a plurality of radially extending blocks.

43. The dynamo according to claim 28 wherein the plurality of sections comprise a plurality of bars extending in the direction of the axis.

44. The dynamo according to claim 1 wherein the first stator yoke and the second stator yoke each comprises magnetic steel including pure iron.

45. A bicycle comprising:
a frame;
a front wheel rotatably mounted at a front of the frame;
a rear wheel rotatably mounted at a rear of the frame; and
a dynamo disposed on at least one of the front wheel and the rear wheel, wherein the dynamo comprises:
an annular member having a magnet extending in a circumferential direction thereof for rotation around an axis;
a first stator yoke having a first annular portion and a plurality of first pole shoes extending in a direction of the axis and facing the magnet;
a second stator yoke having a second annular portion and a plurality of second pole shoes extending in the direction of the axis and facing the magnet;
wherein the plurality of first pole shoes are interleaved with the plurality of second pole shoes in the circumferential direction;
a core yoke for magnetically coupling the first stator yoke and the second stator yoke and for transmitting a magnetic flux in the direction of the axis;
a coil disposed around the core yoke; and
a first separation member formed of metal disposed between the first stator yoke and the core yoke.

46. The dynamo according to claim 45 wherein the first separation member includes a radially extending discontinuity.

47. The dynamo according to claim 46 wherein the first separation member comprises a first separation plate having a disk shape.

48. The dynamo according to claim 47 wherein the first separation plate has a central opening, and wherein the discontinuity extends radially outwardly from the central opening.

49. The dynamo according to claim 48 wherein the discontinuity extends to an outer peripheral edge of the first separation plate.

50. The dynamo according to claim 49 wherein the first separation plate defines a slit forming the discontinuity.

51. The dynamo according to claim 45 wherein the first separation member defines a plurality of first discontinuities in a circumferential direction thereof.

52. The dynamo according to claim 51 wherein the first separation member comprises a first separation plate defining a plurality of first slits forming the plurality of first discontinuities.

53. The dynamo according to claim 52 wherein the first separation plate comprises a silicon-containing magnetic steel.

54. The dynamo according to claim 53 wherein the first separation plate has a disk shape, and wherein the plurality of first slits extend radially outwardly.

55. The dynamo according to claim 54 wherein at least one of the plurality of first slits extends to an outer peripheral edge of the first separation plate.

56. The dynamo according to claim 45 further comprising a second separation member disposed between the second stator yoke and the core yoke.

57. The dynamo according to claim 56 wherein the second separation member is formed of metal.

58. The dynamo according to claim 57 wherein the first separation member includes a radially extending first discontinuity, and wherein the second separation member includes a radially extending second discontinuity.

59. The dynamo according to claim 58 wherein the first separation member comprises a first separation plate having a disk shape, and wherein the second separation member comprises a second separation plate having a disk shape.

60. The dynamo according to claim 59 wherein the first separation plate has a first central opening, wherein the first discontinuity extends radially outwardly from the first central opening, wherein the second separation plate has a second central opening, and wherein the second discontinuity extends radially outwardly from the second central opening.

61. The dynamo according to claim 60 wherein the first discontinuity extends to an outer peripheral edge of the first separation plate, and wherein the second discontinuity extends to an outer peripheral edge of the second separation plate.

62. The dynamo according to claim 61 wherein the first separation plate defines a first slit forming the first discontinuity, and wherein the second separation plate defines a second slit forming the second discontinuity.

63. The dynamo according to claim 56 wherein the first separation member defines a plurality of first discontinuities in a circumferential direction thereof; and wherein the second separation member defines a plurality of second discontinuities in a circumferential direction thereof.

64. The dynamo according to claim 63 wherein the first separation member comprises a first separation plate defining a plurality of first slits forming the plurality of first discontinuities; and wherein the second separation member comprises a second separation plate defining a plurality of second slits forming the plurality of second discontinuities.

65. The dynamo according to claim 64 wherein the first separation plate and the second separation plate each comprises a silicon-containing magnetic steel.

66. The dynamo according to claim 65 wherein the first separation plate and the second separation plate each has a disk shape, wherein the plurality of first slits extend radially outwardly, and wherein the plurality of second slits extend radially outwardly.

67. The dynamo according to claim 66 wherein at least one of the plurality of first slits extends to an outer peripheral edge of the first separation plate.

68. The dynamo according to claim 67 wherein at least one of the plurality of second slits extends to an outer peripheral edge of the second separation plate.

69. The dynamo according to claim 45 wherein the first stator yoke and the second stator yoke each comprises magnetic steel including pure iron.

70. The dynamo according to claim 45 wherein the annular member comprises a cylinder forming an external rotor, wherein the magnet extends around an inner peripheral surface of the annular member, wherein the first stator yoke, the second stator yoke, the core yoke and the coil are disposed coaxially within the cylinder and form an internal stator.

71. The dynamo according to claim 70 wherein the plurality of first pole shoes extend in the direction of the axis from an outer peripheral edge of the first annular portion, wherein the plurality of second pole shoes extend in the direction of the axis from an outer peripheral edge of the second annular portion, and wherein the core yoke magnetically couples an inner peripheral portion of the first annular portion with an inner peripheral portion of the second annular portion.

72. The dynamo according to claim 71 wherein the internal stator is fixed to a hub axle of one of the front wheel and the rear wheel, and wherein the external rotor is coupled to a rotating portion of the one of the front wheel and the rear wheel.

73. The dynamo according to claim 45 wherein the core yoke includes a plurality of sections disposed at different positions in a circumferential direction of the core yoke.

74. The dynamo according to claim 73 wherein the annular member comprises a cylinder forming an external rotor, wherein the magnet extends around an inner peripheral surface of the annular member, wherein the first stator yoke, the second stator yoke, the core yoke and the coil are disposed coaxially within the cylinder and form an internal stator.

75. The dynamo according to claim 74 wherein the plurality of first pole shoes extend in the direction of the axis from an outer peripheral edge of the first annular portion, wherein the plurality of second pole shoes extend in the direction of the axis from an outer peripheral edge of the second annular portion, and wherein the core yoke magnetically couples an inner peripheral portion of the first annular portion with an inner peripheral portion of the second annular portion.

76. The dynamo according to claim 75 wherein the internal stator is fixed to a hub axle of one of the front wheel and the rear wheel, and wherein the external rotor is coupled to a rotating portion of the one of the front wheel and the rear wheel.

77. The dynamo according to claim 73 wherein the plurality of sections comprise silicon-containing magnetic steel.

78. The dynamo according to claim 73 wherein the plurality of sections comprise a plurality of sheet members.

79. The dynamo according to claim 78 wherein the plurality of sheet members are stacked in parallel in the direction of the axis.

80. The dynamo according to claim 73 wherein the plurality of sections are interlocked.

81. The dynamo according to claim 80 wherein the plurality of sections include a plurality of convexities that engage a plurality of concavities.

82. The dynamo according to claim 81 wherein at least one of the plurality of sections includes a hole for engaging a convexity on another one of the plurality of sections.

83. The dynamo according to claim 73 wherein the core yoke includes a bobbin on which the coil is wound, and wherein the plurality of sections are disposed at an inner peripheral portion of the bobbin.

84. The dynamo according to claim 83 wherein the plurality of sections engage a plurality of notches formed on the inner peripheral portion of the bobbin.

85. The dynamo according to claim 73 wherein the plurality of sections comprise a plurality of radially extending members.

86. The dynamo according to claim 85 wherein the plurality of sections comprise a plurality of radially extending sheets.

87. The dynamo according to claim 85 wherein the plurality of sections comprise a plurality of radially extending blocks.

88. The dynamo according to claim 73 wherein the plurality of sections comprise a plurality of bars extending in the direction of the axis.

* * * * *